(No Model.)
E. E. HARDY & S. A. WALL.
FASTENER FOR HARNESS MOUNTINGS.
No. 345,428. Patented July 13, 1886.
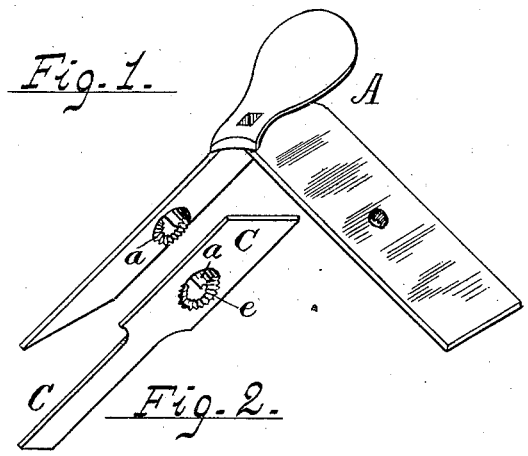
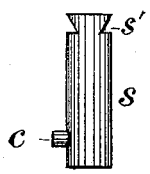
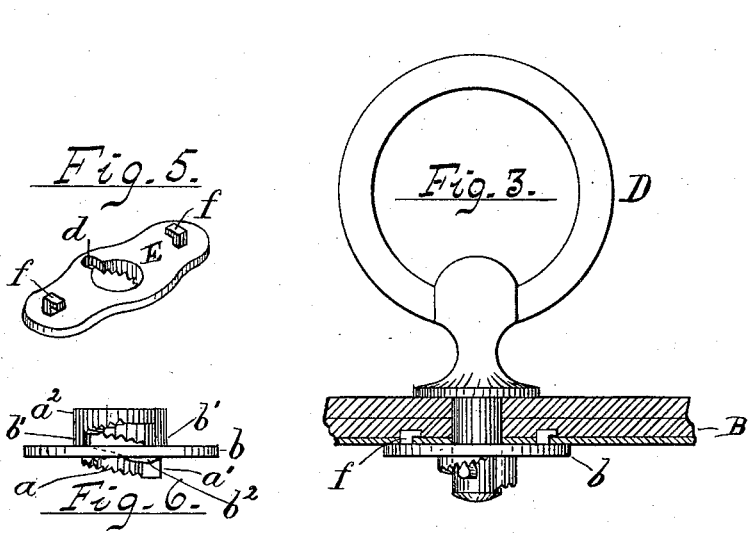
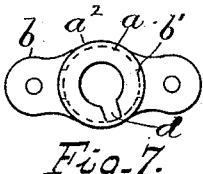
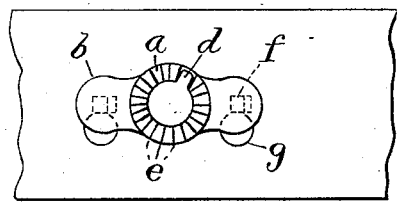
Attest:
L. Lee
Henry J. Theberath
Inventor
E. E. Hardy and S. A. Wall
per Crane & Miller, Attys

UNITED STATES PATENT OFFICE.

EMERY E. HARDY AND STEPHEN A. WALL, OF NEWARK, NEW JERSEY.

FASTENER FOR HARNESS-MOUNTINGS.

SPECIFICATION forming part of Letters Patent No. 345,428, dated July 13, 1886.

Application filed November 6, 1885. Serial No. 182,017. (No model.)

*To all whom it may concern:*

Be it known that we, EMERY E. HARDY and STEPHEN A. WALL, citizens of the United States, residing, respectively, in Newark, Essex county, New Jersey, have invented certain new and useful Improvements in Fasteners for Harness-Fixtures, fully described and represented in the following specification and the accompanying drawings, forming a part of the same.

The object of this invention is to substitute for the screw-threads usually employed to secure terrets, rein-hooks, pad-screws, and similar harness attachments a spiral seat around the shank of the terret and a pin projecting therefrom to engage with such seat when the shank is rotated. The seat is formed upon its inner side with a groove, through which the pin may be passed, and the seat is preferably formed with serrations to retain the pin in place and prevent the shank from turning backward and becoming loose, as many screwed harness-mountings are liable to do.

The construction is shown in the annexed drawings, in which Figure 1 represents in perspective a saddle-tree having the seat formed directly thereon to receive the terret-shanks. Fig. 2 is a similar view of a stiffener with the seat formed thereon, instead of on the tree. Fig. 3 is a side view of a terret secured in the side of a saddle by a seat formed on a loose nut, the saddle being only partly shown, and being drawn in section to display the fastening for the nut, which consists in bent lugs engaged in slots in the tree. Fig. 4 is a view of the under side of the nut and part of its attached tree. Fig. 5 is a perspective view of the same nut, to show the bent lugs more clearly. Fig. 6 is a side view of a nut with double spiral seat. Fig. 7 is a top view of the same. Fig. 8 is a side view of a pad-screw provided with our improvement. Fig. 9 is a view of its lower end, and Fig. 10 a shank detached.

A is the tree, B the flap, C the stiffener, D the terret, E the pad-screw, and $s$ a shank detached.

The spiral seat $a$ may be formed directly upon the stiffener or tree or upon a nut, $b$, attached to either separately, and the shank of the terret, hook, or pad-screw is provided with a pin or stud, $c$, adapted to rest upon the spiral seat when inserted through the groove $d$ in the latter and turned in the proper direction. The pin is preferably formed with an acute edge upon the side next the seat and the latter indented radially, as at $e$ in Figs. 2 and 3, so as to retain the edge of the pin, and thus prevent the rotation and unfastening of the shank.

In Figs. 3 and 4, $f$ are the bent lugs formed upon the base of the nuts $b$, and $g$ are the slots formed on the tree or stiffener, as is common in attaching such parts together by nails, the slots having a hole, $g$, at one end, to admit the bent head of the lug, which is then retained in place by shifting the lugs into the slots, where they are held by the insertion of the terret-shank through the tree and nut.

In Fig. 6 the spiral seat is formed partly upon a hub, $a'$, projected from the inner side of the nut $b$, and partly within a shell, $a^2$, projected from the outer side of the nut—that is, the side next the terret or rein-hook.

The shell $a^2$ is shown in plan in Fig. 7, and is provided with a groove, $d$, to admit the pin $c$, the shell being connected with the plate of the nut $b$ by posts $b'$.

The spiral seat is formed continuously within the shell through the plate and upon the end of the hub $a'$, a spiral groove, $b^2$, being necessitated where the pin moves through the plate and emerges upon the spiral seat and the hub $a'$. This construction enables us to secure nearly two rotations of the shanks, to compensate for variations in the length of the same and in the thickness of the stock through which the shank and seat are applied.

Figs. 8 and 9 show a pad-screw provided with a pin, $c$, having an acute edge inclined to one side to operate upon a spiral seat without the serrations shown herein. By forming the seat of brass and the pin and shank of iron such an inclined edge would be adapted to indent the face of the seat when turned strongly to the required position, and thus prevent the retraction of the shank and the loosening of the same when in use.

As terrets, rein-hooks, and similar harness-fixtures are clamped upon a considerable thickness of yielding leather, we find that in practice such a fixture as a terret or rein-hook may be turned to the required position by the compression of the leather, or that a bit of leather packing can be inserted at some point between the collar of the shank and the plate or flange of the nut $b$, to produce the required pressure of the pin upon the spiral seat when the shank is turned in the desired position.

Fig. 10 shows a shank, $s$, detached and formed with a dovetail head, $s'$, adapted to cast into the foot of a terret or rein-hook or other fixture, and by furnishing such detached shanks and nuts provided with outer spiral seats we are enabled to supply those who make harness-trimmings with the means to apply our invention to any style of trimmings that they may manufacture. Such shanks would be inserted in the mold, and the trimmings cast thereon, thereby securing a complete fastening upon such trimmings without the need of cutting a screw-thread thereon. As different manufacturers have furnished their trimmings with screw-threads of different pitches and diameters, it has heretofore been impossible to make up harness-saddles with the requisite nuts in position, because it could not be known what style of trimmings would be ultimately applied to such harness.

By the use of our invention the nut with spiral seat may be secured in the harness-saddle irrespective of the style of trimmings subsequently used, as we use no screw-threads upon the shank, but manufacture the seat and shank of a uniform size for all classes of harness-trimmings, and thereby avoid the annoyance entailed by the use of diverse screw-threads, as heretofore.

The seat may be formed integral with the saddle-tree, as in Fig. 1, or with the stiffener, as in Fig. 2, and the saddle may thus be made up without reference to the trimmings, and the latter applied at any subsequent time.

By our improvement a harness-manufacturer may be prepared to fill all orders with much less delay than heretofore, as he is enabled to manufacture any quantity of harness-saddles with our spiral seats inserted, and apply thereto any style of fixtures that may be desired by the purchaser.

A modification of the bent lugs is shown in Fig. 5, where they are turned toward opposite sides of the nut-plate, so that they may be inserted in an ordinary slotted tree and retained in position by a rotary movement upon the shank of the terret. Such a construction is a precise equivalent of that shown in Figs. 3 and 4.

The pin $c$ may be formed with two projecting edges to engage the serrations in the seat, the edges being arranged to bear evenly upon the adjacent notches, or two separate pins may be employed adjusted to bear simultaneously in different notches. In such case the groove $d$ would be formed to admit such pin or pins, and a greater security would be obtained against the retraction of the shank.

What we claim herein is—

1. The improved nut for harness-fixtures, having a central hole to receive the shank of the fixture, a spiral seat upon its inner side, arranged substantially as set forth, and a groove, $d$, to admit a pin upon the shank, substantially as shown and described.

2. The combination, with a nut having a central hole to receive the shank of the fixture, and a spiral seat upon its inner side provided with notches or serrations, for the purpose set forth, of the shank provided with pin $c$, having an acute edge to fit such serrations, and a groove, $d$, in the nut, to admit the pin, substantially as shown and described.

3. The combination, with a harness-fixture having a shank provided with a lateral pin, as set forth, of a nut having a central hole to receive the shank, a spiral seat upon its inner side, and a groove, $d$, to admit the pin upon the shank, the whole arranged and operated as and for the purpose set forth.

4. In a harness-saddle or analogous article, the combination, with the fixture applied to the outside of the article, of a shank provided with a pin projecting laterally, as described, and a nut with spiral seat fixed within the article and adapted to admit the shank and to engage the pin when the shank is rotated, as and for the purpose set forth.

In testimony whereof we have hereunto set our hands in the presence of two subscribing witnesses.

EMERY E. HARDY.
STEPHEN A. WALL.

Witnesses:
THOS. S. CRANE,
L. LEE.